(12) United States Patent
Roa-Espinosa

(10) Patent No.: US 10,464,834 B2
(45) Date of Patent: Nov. 5, 2019

(54) SEPARATION OF BIOCOMPONENTS FROM WASTE MATERIALS

(71) Applicant: Aicardo Roa-Espinosa, Madison, WI (US)

(72) Inventor: Aicardo Roa-Espinosa, Madison, WI (US)

(*) Notice: Subject to any disclaimer, the term of this patent is extended or adjusted under 35 U.S.C. 154(b) by 997 days.

(21) Appl. No.: 14/791,409

(22) Filed: Jul. 4, 2015

(65) Prior Publication Data

US 2017/0001879 A1    Jan. 5, 2017

(51) Int. Cl.
*C02F 1/24* (2006.01)
*C02F 9/00* (2006.01)
*C02F 101/30* (2006.01)
*C02F 101/32* (2006.01)
*C02F 103/22* (2006.01)

(52) U.S. Cl.
CPC ............. *C02F 9/00* (2013.01); *C02F 1/24* (2013.01); *C02F 2101/30* (2013.01); *C02F 2101/32* (2013.01); *C02F 2103/22* (2013.01)

(58) Field of Classification Search
CPC .......... C02F 1/24; C02F 9/00; C02F 2101/30; C02F 2101/32; C02F 2103/22; C02F 1/40; C02F 1/5245; C02F 1/56; C02F 11/125; C02F 2001/007; C02F 2303/24; C02F 2305/04

USPC .................................................. 210/703–707
See application file for complete search history.

(56) References Cited

U.S. PATENT DOCUMENTS

| | | | | |
|---|---|---|---|---|
| 4,013,555 A | * | 3/1977 | Davis ............... | C02F 1/5236 210/725 |
| 4,855,065 A | * | 8/1989 | Keeter ............ | B01D 17/00 210/776 |
| 6,132,625 A | * | 10/2000 | Moffett .......... | C02F 1/5236 210/705 |
| 2011/0120955 A1 | * | 5/2011 | Wood ............. | B03D 1/02 210/705 |

FOREIGN PATENT DOCUMENTS

JP    2004243185 A   * 9/2004

\* cited by examiner

*Primary Examiner* — Thomas M Lithgow
(74) *Attorney, Agent, or Firm* — Steven H. Greenfield; Greenfield Invention and Patent Consulting Inc.

(57) ABSTRACT

A multi stage process for the separation of bio-components from grease trap waste and animal waste materials is disclosed. Targeted polymers are added to the source and separated streams prior to passing the streams through separation equipment including a rotary screen, one or more presses, a dissolved air floatation device and a clarifier in which the waste stream is separated into a stream containing predominantly oil, grease and protein, a stream containing predominantly water and a stream that predominantly contains fibers.

9 Claims, 2 Drawing Sheets

SEPARATION OF BIOCOMPONENTS FROM WASTE MATERIALS

FIELD OF THE INVENTION

The present invention relates generally to a process of recovering useful materials from waste streams containing grease, oil protein, water and fiber.

BACKGROUND OF THE INVENTION

Waste materials from a number of sources contain mixtures of oils, grease, protein, fibers and water at varying percentages. Two examples are: grease trap materials and animal processing waste such as animal blood and animal meat originating from slaughterhouses.

Slaughterhouse wastes are a potential reservoir of bacterial, viral, prion and parasitic pathogens capable of infecting both animals and humans. Different methods for the disposal of such wastes currently exist, including composting, anaerobic digestion (AD), alkaline hydrolysis (AH), rendering, incineration and burning. However, these methods are expensive and fail for the most part in recovering the valuable byproducts in these wastes.

Grease trap material is a complicated solid/liquid mixture. Apart from small fibers, these materials contain water, food waste with protein-enriching components, including undigested protein, and oil with high Free Fatty Acids (FFA) content. An effective method of separating grease trap material may produce enriched nutrient clarified water, oil for animal feed, biodiesel feedstock and/or nutrient-rich organic solids for multiple uses.

The grease trap waste solids have a nitrogen content of around 3.51% that is a good source of protein. The nitrogen is in the form of indigestible forage proteins. Soluble protein in food waste hydrolyzes easily allowing the fermentation of sugars.

Some of the most expensive and reoccurring costs for water treatment facilities are the maintenance costs dealing with improper disposal of grease trap material. This occurs when restaurants fail to maintain the below ground grease traps or when grease haulers cannot find an appropriate place to offload the grease. The grease is then dumped into the municipal, county or private system or discarded onto open land. Both are not acceptable practices.

The materials originating from grease traps typically have a brown color from the frying they often undergo. Consequently, these materials are referred to as brown grease.

There are very few ways to manage this material without high-energy costs, expensive machinery, and a substantial odor issue. Examples of brown grease compositions are shown below in tables 1 and 2.

TABLE 1

Brown Grease composition (All values are %).

|  | Brown Grease Composition (7 Samples Florida) |
|---|---|
| Water content (% total) | 91 |
| Dry matter content (% total) | 6.5 |
| Crude protein (%) | 1.49 |
| Crude oil (%) | 3.51 |
| Crude fiber (%) | 0.235 |

TABLE 2

Brown Grease elements content in seven samples.

| Elements | Brown Grease Solids Composition (7 samples Florida) |
|---|---|
| Phosphorus (% total) | 1.15% |
| Potassium (% total) | 0.1% |
| Sodium | 1.49% |
| Kjeldahl Nitrogen | 3.51% |
| Nitrogen | 3.51% |
| Organic Carbon | 98% |
| Nickel | 0.044% |
| Zinc | 0.385% |
| Cadmium | 0.00014% |
| Chromium | 0.028% |
| Copper | 0.0168% |
| Molybdenum | 0.0001% |

It would therefore be desirable to provide a process to separate these materials in order to maximize their uses.

SUMMARY OF THE PRESENT INVENTION

In an aspect of the present invention, a multi-stage substantially continuous process for separating a source stream containing waste materials, the source stream intermixedly containing fibers, water, grease, protein and oil, the process being configured for separating the source stream into a stream containing predominantly water, a stream containing predominantly non-aqueous solids, and a stream containing predominantly non-aqueous fluids, the process comprises the stages of: providing a first stream comprising waste materials, the waste materials stream containing water, oil, protein and fibers; separating the first stream into a second stream and a third stream, the second stream containing predominantly water, the second stream also containing non-aqueous solids, the third stream containing predominantly water, the third stream also containing a mixture of non-aqueous solids and non-aqueous fluids; separating a fourth stream and a fifth stream from the third stream, the fourth stream containing predominantly non-aqueous solids, the fourth stream also containing water, the fifth stream containing predominantly water, the fifth stream also containing non-aqueous liquids; and separating from the fifth stream a sixth stream containing predominantly non-aqueous liquids and a seventh effluent stream comprising predominantly water.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Two embodiments of the present invention are presented. The first embodiment generally requires a clarifier for managing the separation of the materials. The second embodiment does not generally require a clarifier, but requires a heat exchanger to heat a stream.

Figure 1:
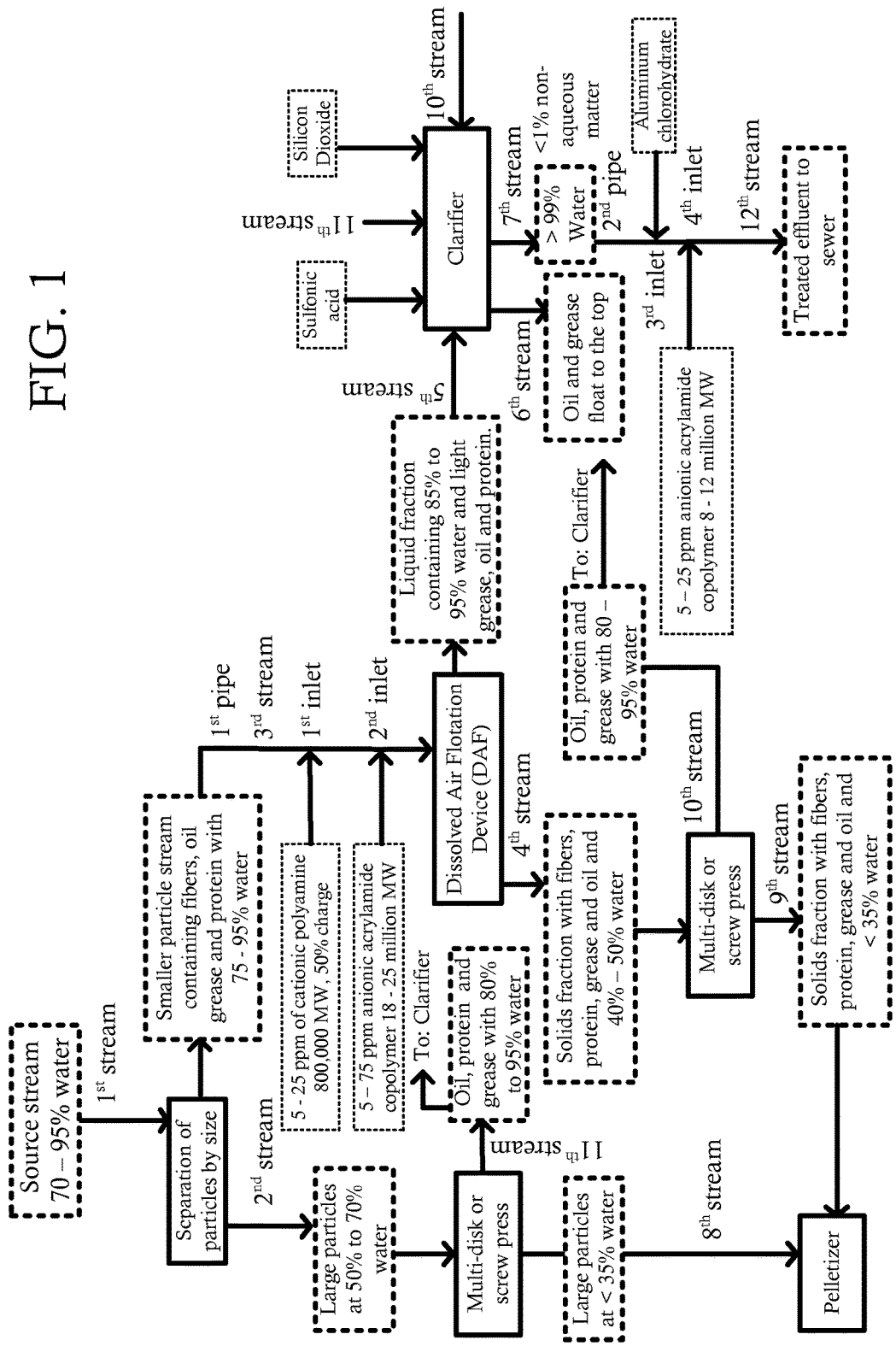
FIG. 1 is a flow schematic of the process according to a first embodiment of the present invention.

FIG. 1 is a schematic of a first embodiment of the process for separating bio-components from waste materials containing water, oil, grease, protein and fibers. The source of these materials includes but is not limited to grease trap waste materials and waste from animal slaughterhouses that includes mixtures of animal blood and animal meat, animal urine and animal feces. The animal waste may also contain cleaning materials and curing salts used for preventing the spread of diseases.

The separation process described in FIG. 1 is carried out at room temperature. A source stream, labeled as the first stream, contains waste materials comprising of variable amounts of water, ranging from about 70% to about 95%, and varying amounts of oil, grease, protein and fibers.

The first stream is passed through a separator of large particles from small particles where it is separated into a second stream that constitutes of large particles having a relatively low water content at between about 50% to about 70% and a third stream having a water content of between about 75% to about 95% and smaller average particle size compared to the second stream. The separator may be a rotating screen or an oval multidisc press; however other types of separators also fall within the scope of the present invention.

The second stream is then passed through a press that separates the second stream into an eighth stream that is the residual stream after the liquid portion is pressed out and an eleventh stream which is the pressed out liquid. The press may be a screw press or a multidisc press. The eleventh stream contains typically between about 80% to 95% moisture with the remainder 5% to 20% constituting mostly oil and grease with the fibers content being less than 1%. The eighth stream contains predominantly fibers with a moisture content of typically less than 35% and is in a form that can be sent to a pelletizer for producing animal feed in the form of pellets.

The third stream is passed through a first 1" pipe having a first and second inlet that are spaced about 15 seconds apart based on the average volumetric flow rate through the pipe. The first pipe is leading toward a Dissolved Air Floatation device (DAF). The Dissolved Air Floatation device uses micronized air for separating a stream having a relatively low solids form a stream having higher solids. The Dissolved Air Floatation device of the present invention is also equipped with a piston pump and an eductor system to safely clear large solids particles and sand from clogging the Dissolved Air Floatation device.

Between about 5 ppm and about 25 ppm of a cationic polyamine having a 50% charge and a MW of about between about 800,000 and 1,500,000 and between about 40% and about 50% charge are added to the third stream at the first inlet of the first pipe and between about 5 ppm and about 25 ppm of anionic acrylamide copolymer having a MW of between about 18 million to about 25 million are added at the second inlet. The Dissolved Air Floatation device (DAF) splits the third stream into a fourth stream that contains predominantly non-aqueous matter and a fifth stream containing predominantly aqueous matter of which the water content is at least 50%. The fourth stream contains mostly non-aqueous matter in fibers, grease and oil with the water content at between about 40 percent and about 50 percent. The fourth stream is then passed through a press which produces a ninth stream having relatively high non-fluid contents (over 65%) and a tenth stream that consists of between about 80 percent to about 95% water with the remainder consisting of mostly liquid oil, with smaller amounts of grease and protein.

The fifth stream is pumped into a clarifier where it is separated into a sixth stream and a seventh stream. The sixth stream comprises predominantly of oil and grease that float onto the top of the clarifier while the seventh stream comprises predominantly of water with non-aqueous matter of less than 1 percent. To effect the separation, between about 0.25 percent and about 0.5 percent on an active basis of sulfonic acid and between about 0.35 percent and about 1.0 percent of silicon dioxide on an active basis are added to the clarifier.

The seventh stream is treated with between about 0.5 percent and about 1.5 percent on an active basis of aluminum chlorohydrate and between about between 5 ppm and about 25 ppm of anionic acrylamide copolymer having a MW of between about 8 million to about 12 million in order to reduce the COD and BOD of the water to acceptable levels for discharge into the sewer as the twelfth stream. The tenth and eleventh streams are combined with the fifth stream for treatment in the clarifier.

It is noted that the term "contains predominantly" refers to a content of more than 50% in the context of the present invention. Oil has a relatively low MW, a relatively low viscosity and high unsaturated fats content originating mostly from vegetables. Grease in the context of the present invention originates mostly from fried foods with a relatively high density, high viscosity and high MW compared to oil. Its color tends to be dark yellow or brown as at least some of it has undergone through a cooking process.

In the context of the present invention, oils generally derive from vegetables and are in liquid from at room temperature. Grease generally derives from animal fats and is semisolid at room temperature and appears as solid particles in dispersions. Also, in this context, non-aqueous matter refers to fluids that may consist of oil, grease, protein as well as short fibers, typically between about 0.1 inches and 0.25 inches. The non-aqueous matter may be intermixed with water. The term "solids" may be used interchangeably with the term "non-aqueous"; however, "solids" typically represent non-fluid materials such as fibers or gelled grease. Thus, a composition of heavy oils, grease, fatty acids and fibers may have a thick a viscous texture would be referred to as non-aqueous solids, while a composition containing mostly light oils that behaves as a fluid would be referred to a non-aqueous liquid or fluid.

Figure 2:
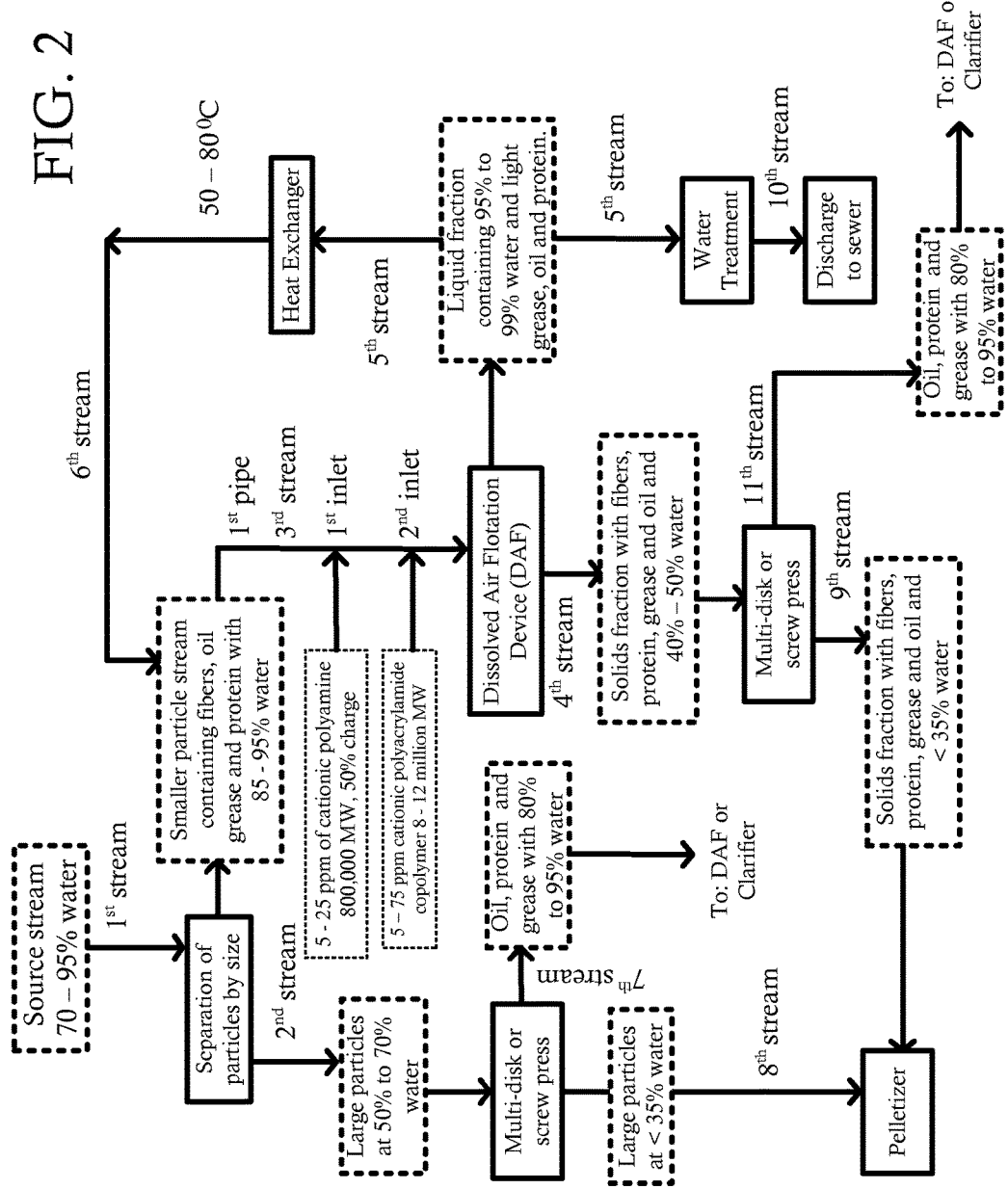
FIG. 2 is a flow schematic of the process according to a second embodiment of the present invention.

FIG. 2 represents a second embodiment of a process to separating bio-components from waste materials containing water, oil, grease, protein and fibers. The source of these materials includes but is not limited to grease trap waste materials and waste from animal slaughterhouses that includes mixtures of animal blood and animal meat, animal urine and animal feces. The animal waste may also contain cleaning materials and calcium and sodium based curing salts used for preventing the spread of diseases.

The first stream is passed through a separator member configured to separate large particles from small particles where the first stream is separated into a second stream that constitutes of large particles having a relatively low water content at between about 50% to about 70% and a third stream having a water content of between about 75% to about 95% and smaller average particle size compared to the second stream. The separator member may be a rotating screen or an oval multidisc press; however other separator types also fall within the scope of the present invention.

The second stream is then passed through a press that separates the second stream into an eighth stream that is the residual stream after the liquid portion is pressed out and a seventh stream which is the pressed out liquid. The press may be a screw press or a multidisc press. The seventh stream contains typically between about 80% to 95% moisture with the remainder 5% to 20% constituting mostly oil and grease with the fibers content being less than 1%. The eighth stream contains predominantly fibers with a moisture content of typically less than 35% and is sent to a pelletizer for producing animal feed in the form of pellets.

The third stream is passed through a first 1" pipe having a first and second inlet that are spaced about 15 seconds apart based on the average volumetric flow rate through the pipe. The first pipe is leading toward a Dissolved Air Floatation device (DAF).

Between about 5 ppm and about 25 ppm of a cationic polyamine having a 50% charge and a MW of about 800,000 are added to the third stream at the first inlet of the first pipe and between about 5 ppm and about 75 ppm of cationic polyacrylamide copolymer, preferably ADMAEA, having a MW of between about 8 million to about 12 million are added at the second inlet. The Dissolved Air Floatation device (DAF) splits the third stream into a fourth stream containing predominantly non-aqueous matter and a fifth stream containing predominantly aqueous matter of which the water content is at least 50%. Generally the addition of the cationic polyacrylamide copolymer is sufficient for performing the separation of the third stream; however the cationic polyamine may help separation efficiency.

The fourth stream contains mostly non-aqueous matter in fibers, grease and oil with the water content at between about 40 percent and about 50 percent. The fourth stream is then passed through a press which produces a ninth stream having relatively high non-fluid contents (over 65%) and an eleventh stream that consists of between about 80 percent to about 95% water with the remainder consisting of mostly liquid oil, with smaller amounts of grease and protein.

The eleventh stream and the seventh stream that contain water at around 80-95% may be recycled to the Dissolved Air Floatation device (DAF). Optionally, they may be fed into a clarifier for further separating the oil, protein and grease from water. In the clarifier, the oil, protein and grease float to the top while water at >99% content is treated enzymatically, then discharged to the sewer.

Between about 70% and 90% of the fifth stream is passed through a heat exchanger and heated to between about 50-80° C. to form a sixth stream and recycled to the Dissolved Air Floatation device. The remainder of the fifth stream undergoes a water treatment step to form a tenth stream that has conforming BOD and COD levels for discharge to the sewer.

The following represents the important characteristics of the polymers used in the process:

Polyamines
  Molecular weight between 800,000 and 1,500,000.
  Liquid form with 40 to 50% concentration and 40% to 50% charge.
  Cationic site on the main chain.
  Viscosity at 50% concentration of between 40 and 20,000 centipoises.
  Any polyamine having two $H_2N$ groups may be used in this application. An example may be 1,3-diaminopropane.

Potassium or Sodium Anionic Acrylate Acrylamide Copolymer.

This polymer may be made from the reaction between an acrylamide monomer and an acrylic acid monomer as shown below:

$$CH_2=CH-C(=O)-NH_2 \text{ (Acrylamide)} + CH_2=CH-C(=O)-OH \text{ (Acrylic acid)} \xrightarrow{KOH}$$

$$\left[-CH_2-CH(C(=O)NH_2)-\right]_m \left[-CH_2-CH(C(=O)OK)-\right]_n$$

Potassium Acrylate Acrylamide copolymer $$CH_2=CH-C(=O)-NH_2 \text{ (Acrylamide)} + CH_2=CH-C(=O)-OH \text{ (Acrylic acid)} \xrightarrow{NaOH}$$

$$\left[-CH_2-CH(C(=O)NH_2)-\right]_m \left[-CH_2-CH(C(=O)ONa)-\right]_n$$

Sodium Acrylate Acrylamide copolymer

The anionicity of these copolymers can vary between 0% and 100% depending on the ratio of the monomers involved. The anionic copolymers used in the process of the present invention may have a molecular weight ranging between about 3 million to about 30 million, and a viscosity at a concentration of 5 g/l ranging from about 200 centipoises to about 2800 centipoises. The preferred pH range for making these copolymers is from 4.5 to 9.

ADMAEA
  Acrylamide-dimethylaminoethyl acrylate copolymers.
  Cationic Polyacrylamide Copolymer.
  The copolymerization of DMAEA-MeCl with acrylamide produces the cationic polymer
  The main characteristics of the products obtained are:
    Molecular weight: about 3 million to about 10 million
  Viscosity at 5 g/l: 100 to 1700 cps.
  Specifically: acrylamide/Ethanaminium, N, N, N-trimethyl-2-((1-oxo-2-propenyl)oxo)-, chloride copolymer is a useful form of ADMAEA in the present invention.
  The molecular formula is $C_{11}H_{21}ClN_2O_3$. The molecular structure is shown below in 2D.

It should be understood, of course, that the foregoing relates to exemplary embodiments of the invention and that modifications may be made without departing from the spirit and scope of the invention.

I claim:

1. A multi-stage substantially continuous process for separating a source stream containing waste materials, said source stream intermixedly containing fibers, water, grease, protein and oil, said process being configured for separating the source stream into a stream containing predominantly water, a stream containing predominantly non-aqueous solids, and a stream containing predominantly non-aqueous fluids, said process comprising the stages of:
provided a first stream comprising waste materials, said waste materials stream containing water, oil, protein and fibers;
separating said first stream into a second stream and a third stream, said second stream containing predominantly water, said second stream also containing non-aqueous solids, said third stream containing predominantly water, said third stream also containing a mixture of non-aqueous solids and non-aqueous fluids;
separating a fourth stream and a fifth stream from said third stream, said fourth stream containing predominantly non-aqueous solids, said fourth stream also containing water, said fifth stream containing predominantly water, said fifth stream also containing non-aqueous liquids, said separating the fourth stream and the fifth stream from said third stream being carried out in a Dissolved Air Floatation device; and
passing the second stream through a press, said press separating said second stream into an eighth stream containing less than 35 percent water and a seventh stream containing predominantly water, said seventh stream also containing a non-aqueous liquid portion of a mixture of protein, oil and grease, said seventh stream being fed into the Dissolved Air Floatation device.

2. The process of claim 1, wherein separating the first stream into the second stream and the third stream is accomplished by passing said first stream through an oval multidisc press.

3. The process of claim 1, wherein separating the fourth stream and the fifth stream from said third stream is accomplished by:
passing said third stream through a first chemical additive pipe having a first chemical addition inlet and a second chemical addition inlet, said first chemical additive pipe leading toward the Dissolved Air Floatation device, said second chemical addition configured to occur about 15 seconds after the first chemical addition based on an average volumetric flow rate through the pipe;
adding between about 5 to about 75 ppm of an cationic acrylamide copolymer to said second chemical addition inlet; and
feeding said third stream into the Dissolved Air Floatation device wherein actions of said Dissolved Air Floatation device separate said third stream into the fourth stream and the fifth stream.

4. The process of claim 3 further comprising adding between about 5 to about 25 ppm of a cationic polyamine to the first chemical addition inlet.

5. The process of claim 3 further comprising passing a portion of said fifth stream through a heat exchanger to form a sixth stream, said action of the heat exchanger raising the temperature of the sixth stream to between about 50 degrees C. to about 80 degrees C., said sixth stream being recycled back into the Dissolved Air Floatation device.

6. The process of claim 5, further comprising passing a remainder of the fifth stream through a water treatment step to form a tenth stream, said tenth stream being discharged into a municipal sewer.

7. The process of claim 1, further comprising passing the fourth stream through a press, said press separating said fourth stream into a ninth stream containing less than 35 percent water and an eleventh stream containing a water emulsion with the non-aqueous liquid portion of a mixture of protein, oil and grease.

8. The process of claim 7 further comprising passing said eighth stream and said ninth stream through a pelletizer for producing animal feed pellets.

9. The process of claim 7 further comprising passing a portion of the seventh stream and a portion of the eleventh stream to a clarifier for further separating out non-aqueous fluids from aqueous fluids from said seventh and eleventh streams.

* * * * *